United States Patent [19]

Ohmura et al.

[11] 4,121,230
[45] Oct. 17, 1978

[54] EXPOSURE CONTROL DEVICE FOR PHOTOGRAPHIC CAMERA

[75] Inventors: Hiroshi Ohmura, Yokohama; Akira Kohashi, Chigasaki, both of Japan

[73] Assignee: Fuji Photo Film Co., Ltd., Minamiashigara, Japan

[21] Appl. No.: 770,650

[22] Filed: Feb. 22, 1977

[51] Int. Cl.² ............... G03B 7/00; G03B 15/03; G03B 17/26; G03B 17/00
[52] U.S. Cl. .............................. 354/21; 354/139; 354/275; 354/289
[58] Field of Search ............ 354/21, 289, 53, 149, 354/196, 139, 275, 126, 202

[56] References Cited

U.S. PATENT DOCUMENTS

| | | | |
|---|---|---|---|
| 3,318,215 | 5/1967 | Schiks | 354/139 |
| 3,421,422 | 1/1969 | Winkler | 354/21 |
| 3,570,382 | 3/1971 | Neudecker et al. | 354/21 |
| 3,817,608 | 6/1974 | Neudecker et al. | 354/21 X |
| 4,041,508 | 8/1977 | Edomoto et al. | 354/289 X |

FOREIGN PATENT DOCUMENTS

| | | | |
|---|---|---|---|
| 1,280,047 | 10/1968 | Fed. Rep. of Germany | 354/139 |
| 2,103,154 | 7/1972 | Fed. Rep. of Germany | 354/289 |

*Primary Examiner*—Donald A. Griffin
*Attorney, Agent, or Firm*—Gerald J. Ferguson, Jr.; Joseph J. Baker

[57] ABSTRACT

An exposure control device for a photographic camera including an exposure control plate for changing an aperture size, a mark indicating plate bearing a plurality of weather marks arranged in a line movable in the direction in which the marks are lined, and a manually operable exposure control knob connected with the exposure control plate. The exposure control knob has an index to be selectively aligned with one of the weather marks. A plurality of distance marks are arranged in a line parallel to the weather marks on the mark indicating plate. The mark indicating plate is movable in a direction perpendicular to the direction in which the marks are lined so that one of the two lines of marks is selectively indicated through an indicator window. A flash sensor which senses the attachment and removal of a flash light device to and from the camera body is connected with the mark indicating plate to move the plate in the direction to selectively indicate one of the two lines of marks through the indicator window in response to attachment and removal of the flash light device. In a preferred embodiment, a film sensitivity sensor which senses the sensitivity of the film loaded in a film cartridge in the camera is connected with the mark indicating plate to move the plate in the direction in which the marks are lined.

10 Claims, 12 Drawing Figures

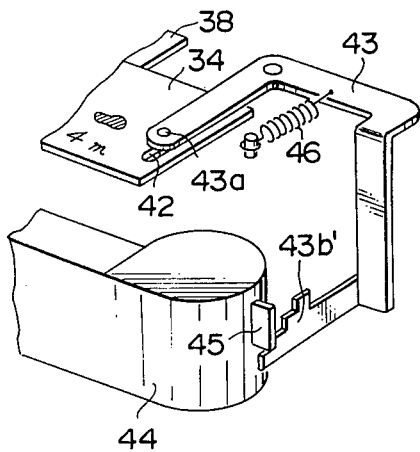
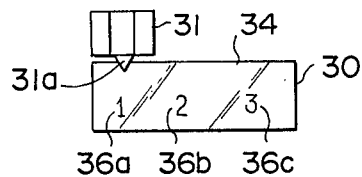
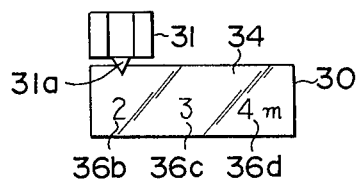
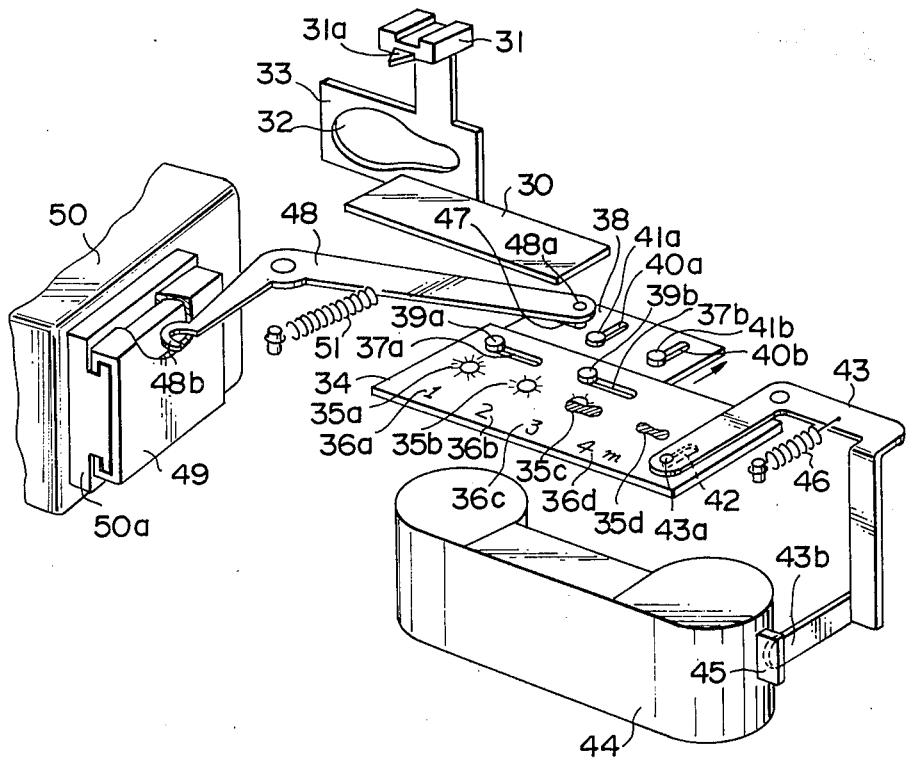

EXPOSURE CONTROL DEVICE FOR PHOTOGRAPHIC CAMERA

BACKGROUND OF THE INVENTION

1. Field of the Invention

This invention relates to an exposure control device for a photographic camera, and more particularly to an automatic exposure control device for a photographic camera in which the exposure is controlled even in a flash light photographying condition. In the exposure control device in accordance with this invention, the condition of the scene brightness or the photographing distance is input. Further, this invention more specifically relates to an automatic exposure control device for an amateur photographic camera in which the exposure is automatically controlled both in the normal and flash light photographing conditions regardless of the sensitivity of the film loaded therein.

2. Description of the Prior Art

In a conventional camera with a flash light device or a camera to which a flash light device is attachable, the exposure must be manually controlled taking in consideration various factors such as the guide number (GN) of the flash light device, the aperture size (F) of the camera, and the photographing distance (L) when a picture is to be taken with flash light. In this case, the relationship between the above three factors as $GN = F \cdot L$ must be taken into account. The account of these factors is complicated and troublesome in the actual operation of the camera.

There is known a camera with automatic exposure control means for ameteur use provided with a condition mark setting device in which one of several condition marks such as weather marks is selected with a dial or slide knob to set the condition of the weather (which indicates the scene brightness) in the automatic exposure control means. This type of camera controls the aperture size according to the set condition. However, this type of camera does not indicate the aperture size on the camera body. Therefore, it is impossible to control the aperture size according to the photographing distance when taking a picture with flash light.

Therefore, it is demanded that the camera has means for setting the photographing distance when the camera is set to take a picture with flash light.

On the other hand, it is known in the art to use a film cartridge provided with a film sensitivity indicating means which indicates the sensitivity of the film loaded therein. The camera adapted to use this kind of film cartridge is provided with a film sensitivity sensing means connected with an exposure control means in which the film sensitivity is sensed by the sensing means and the exposure is controlled taking the film sensitivity into account. The film sensitivity sensing means is electrically connected to the exposure control means, and accordingly, is not able to be connected to a mechanical exposure control device.

Therefore, it is demanded that the camera provided with a mechanical exposure control device is automatically controlled with respect to the film sensitivity indicated on the film cartridge.

SUMMARY OF THE INVENTION

In view of the above description and observations, the primary object of the present invention is to provide an exposure control device for a photographic camera which is simple in structure and provided with means for input of the distance of an object to be photographed when the camera is set to take a picture with a flash light device.

Another object of the present invention is to provide an exposure control device for a photographic camera which is provided with means for input of the film sensitivity indicated on a film cartridge by way of a mechanical input means.

Still another object of the present invention is to provide an exposure control device for a photographic camera which is of mechanical structure and associated with both means for setting the camera in a condition for flash light photographing wherein the distance of an object can be input and means for automatically inputting the film sensitivity indicated on the film cartridge loaded in the camera.

The above objects are accomplished by providing a mark indicating plate on which distance marks are indicated in parallel with weather marks. The mark indicating plate is slidable in the direction in which the respective marks are arranged in two parallel lines in association with an aperture control means so that the marks are moved in said direction when the aperture size is changed. The mark indicating plate is further slidable in the direction perpendicular to said direction so that one of the two kinds of series of marks can be selectively indicated. When the camera is in the state where the pictures are taken without flash light, the weather marks are indicated through a window. When the camera is in the state where the pictures are taken with flash light, the distance marks are indicated through said window. The change of the marks between the two kinds of marks is automatically made upon attachment and removal of a flash light device to and from the camera body.

Further, in a perferred embodiment of the present invention in which the film sensitivity is automatically put into the exposure control, a mark indicating plate is further associated with a film sensitivity sensing means which senses the film sensitivity indicating means provided on a film cartridge. The mark indicating plate is moved in the direction in which said marks are arranged in parallel in two lines so that the weather marks or the distance marks are changed according to the film sensitivity.

BRIEF DESCRIPTION OF THE DRAWING

FIG. 9 is a fragmentary perspective view showing a different example of a film sensitivity sensing means provided in the exposure control device in accordance with the present invention, FIG. 10 is a perspective view showing the exposure control device in accordance with the embodiment as shown in FIG. 5 wherein a flash light device is attached to the camera, FIG. 11 is a plan view of the window in which distance marks are viewed in the exposure control device as shown in FIG. 10, and FIG. 12 is a plan view of the window in which the distance marks viewed as in FIG. 11 are shifted by one step.

DESCRIPTION OF THE PREFERRED EMBODIMENTS

Figure 1:
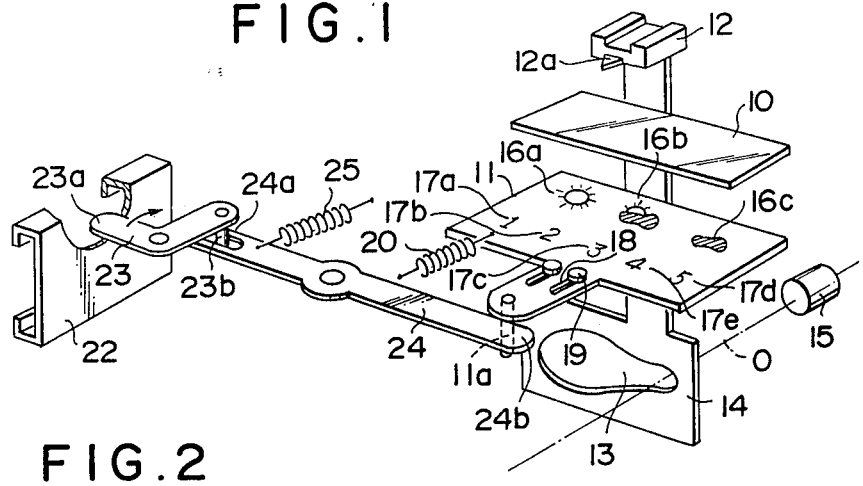
FIG. 1 is a perspective view showing the exposure control device in accordance with an embodiment of the present invention in which the device is in the normal photographing state.

Now preferred embodiments of the present invention will be described in detail with reference to the accompanying drawings. FIG. 1 shows an embodiment of the exposure control device of this invention which is in a normal state in which pictures are to be taken without flash light. Referring to FIG. 1, under an indicator window 10 is provided a mark indicating plate 11 which is horizontally slidable back and forth and laterally. Above the indicator window 10 is provided an exposure control knob 12 having an index 12a which is slidable back and forth. The exposure control knob 12 is integrally fixed to an aperture control plate 14 having an aperture control opening 13 which varies the aperture size when the control plate 14 is moved back and forth in a direction perpendicular to the optical axis 0 of a taking lens 15. The aperture control plate 14 may not be integrally fixed to the exposure control knob 12, but may be connected thereto via a mechanical interconnecting means.

Figure 2:
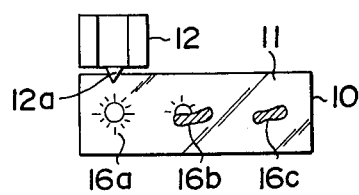
FIG. 2 is a plan view showing the window through which weather marks are viewed in the exposure control device as shown in FIG. 1.

The mark indicating plate 11 is provided with a line of weather marks 16a-16c and a line of distance marks 17a-17e arranged in parallel to each other along the direction in which the mark indicating plate 11 is slidable. The weather marks 16a-16c respectively correspond to aperture sizes of F:11 (fair mark), F:8 (partly cloudy mark) and F:5.6. (cloudy mark). The mark indicating plate 11 is made slidable in the direction perpendicular to the direction in which the two kinds of marks 16a-16c and 17a-17e are lined by means of slidable engagement of a pair of slots 18 and pins 19. The slide of the plate 11 in said direction along the slots 18 is spring urged in the direction to show the weather marks 16a-16c through the indicator window 10 by means of a tension spring 20. One of the two kinds of marks is selectively shown through the indicator window 10. When the weather marks 16a-16c are shown as illustrated in FIG. 2, one of the weather marks 16a-16c is selected by the exposure control knob 12 with the index 12a.

Figure 3:
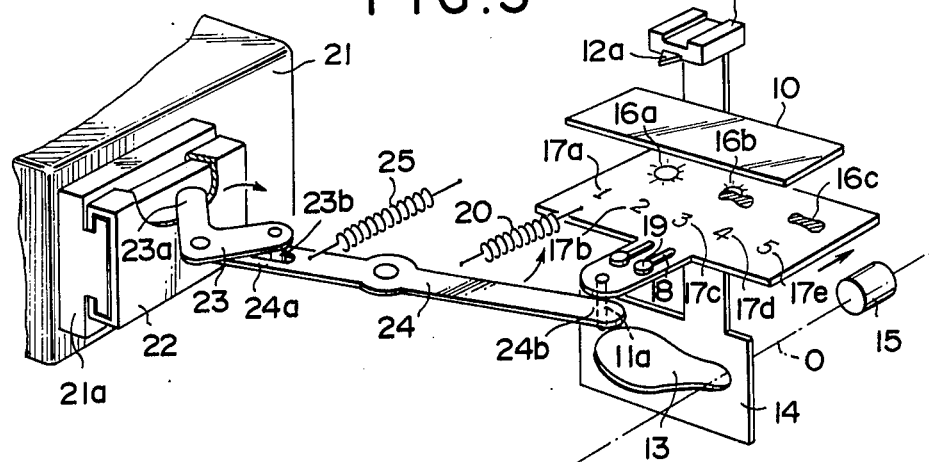
FIG. 3 is a perspective view showing the exposure control device in accordance with the embodiment as shown in FIG. 1 wherein the device is in the flash light photographing state.

In an accessory shoe 22 of a camera, an end 23a of a flash sensing lever 23 is projected. The flash sensing lever 23 is pivotally mounted in the camera so that a pin 23b fixed to its opposite end engaged with a slot 24a of a plate operating lever 24 will be moved to swing the plate operating lever 24 in the direction to slide said mark indicating plate 11 to show the weather marks 16a-16c when a flash light device 21 with a foot 21a is inserted into the shoe 22 as shown in FIG. 3. The plate operating lever 24 is engaged with a pin 11a fixed to said mark indicating plate 11 at its end 24b opposite to the end where said slot 24a is formed so that the end 24b pushes the pin 11a in the direction to show the distance marks 17a-17e in the indicator window 10. The plate operating lever 24 is urged in the direction to project the end 23a of the flash sensing lever 23 in the accessory shoe 22 and release the mark indicating plate 11 in the direction to show the weather marks 16a-16c in the indicator window 10 by means of a tension spring 25.

Now, the operation of the above described embodiment of the present invention will be described in detail with reference to FIGS. 1 to 4. In the normal photographing condition, the mark indicating plate 11 is in the position to show the weather marks 16a-16c in the indicator window 10 being biased with the spring 20 since the plate operating lever 24 is in the position biased with the spring 25 where said end 24b is separated from the pin 11a fixed to the plate 11. Thus, as shown in FIG. 2, the weather marks 16a-16c are viewed in the indicator window 10. According to the weather, the index 12a of the exposure control knob 12 is moved to the proper weather mark, for instance fair mark 16a. Together with the exposure control knob 12, the aperture control plate 14 is moved to the position where the aperture size is properly controlled by the aperture control opening 13 which is brought to the optical axis 0 of the taking lens 15. Thus, the aperture size is properly controlled with the weather conditions.

Figure 4:
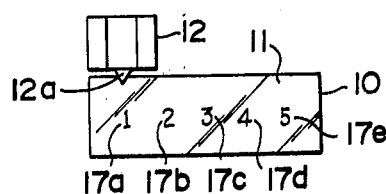
FIG. 4 is a plan view showing the window through which distance marks are viewed in the exposure control device as shown in FIG. 3.

In the flash light photographing condition, a flash light device 21 with the foot 21a is attached to the camera. In this case, the foot 21a is inserted into the accessory shoe 22 and the projected end 23a of the flash light sensing lever 23 is pushed in. As the end 23a of the flash light sensing lever 23 is pushed in, the pin 23b engaged with the slot 24a of the plate operating lever 24 is moved to swing the lever 24 in the direction to push the pin 11a of the mark indicating plate 11 in the direction to show the distance marks 17a-17e overcoming the force of the tension spring 25. Thus, the distance marks 17a-17e are shown in the indicator window 10 as illustrated in FIG. 4. One of the distance marks 17a-17e is selected by the index 12a of the exposure control knob 12. The distance marks 17a-17e show the distance of the object to be photographed in meters. By adjusting the index 12a of the exposure control knob 12 at the mark which indicates the distance of the object to be photographed in meters, the aperture size is properly controlled by the aperture control opening 13 of the aperture control plate 14.

Thus, the above described embodiment of the present invention is capable of controlling the exposure, i.e. the aperture size in this case, in accordance with the weather condition in the normal photographing condition and in accordance with the distance of the object to be photographed in the flash light photographed condition. Further, the two different conditions are automatically set in the exposure control device of this embodiment in response to insertion and removal of a flash light device attachable to the camera.

Now, a second embodiment of the present invention will be described in detail with reference to FIGS. 5 to 10. Similarly to the above described first embodiment, above an indicator window 30 is provided an exposure control knob 31 which has an index 31a. The exposure control knob 31 is fixed to an aperture control plate 33 having an aperture control opening 32. The exposure control knob 31 is slidable back and forth together with the aperture control plate 33 similarly to the foregoing embodiment described with reference to FIGS. 1 to 4. The aperture control plate may be, of course, replaced by a shutter speed controlling means in order that a shutter speed may be controlled instead of the aperture size.

Below said indicator window 30 is slidably provided a mark indicating plate 34. The mark indicating plate 34 is provided with two lines of marks 35a–35d which indicate weather conditions and 36a–36d which indicate the distances of the object to be photographed similarly to the first embodiment. The weather marks respectively correspond to various aperture sizes. For instance, the weather marks 35a to 35d correspond to F:16, F:11, F:8 and F:5.6. The mark indicating plate 34 is provided with longitudinal slots 37a and 37b engaged with a pair of pins 39a and 39b. The pair of pins 39a and 39b are fixed to a mark change-over plate 38 which is slidable in the direction perpendicularly to said longitudinal slots 37a and 37b. The mark change-over plate 38 is provided with a pair of slots 40a and 40b which extend perpendicularly to said longitudinal slots 37a and 37b. The pair of slots 40a and 40b are engaged with a pair of fixed pins 41a and 41b so that the mark change-over plate 38 is slidable in the direction lateral to the direction of slide of said mark indicating plate 34 which is slid back and forth in the direction of said longitudinal slots 37a and 37b that is in the direction in which said marks 35a–35b and 36a–36b are lined. Thus, the mark indicating plate 34 is slidable in the direction of the arrangement of the marks 35a–35d and 36a–36d and in the direction lateral thereto to selectively bring one of the different kinds of marks into alignment with the indicator window 30.

Figure 5:
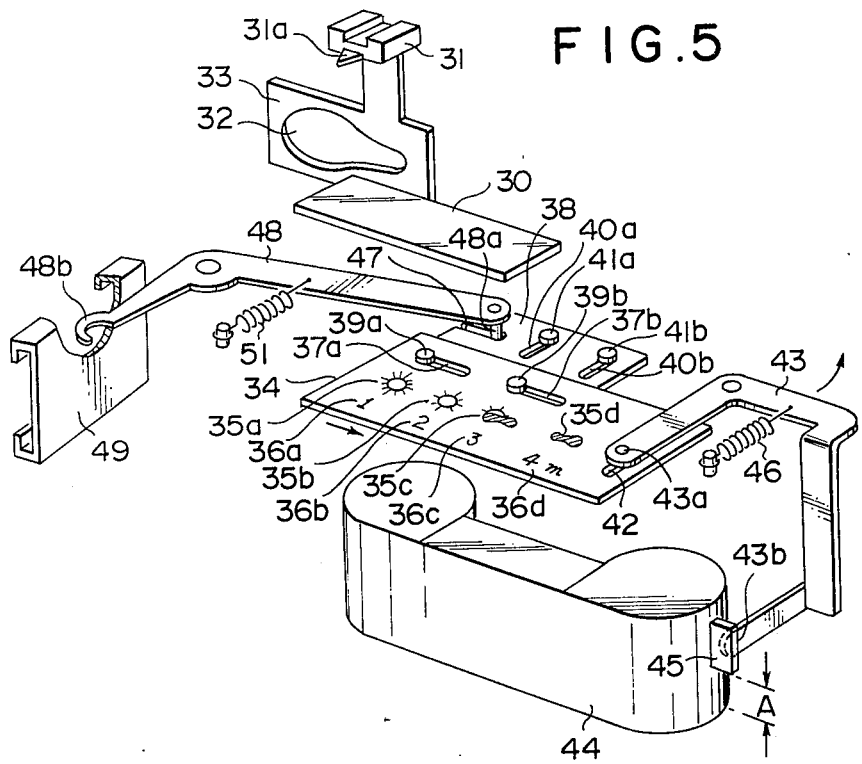
FIG. 5 is a perspective view showing the exposure control device in accordance with another embodiment of the present invention in which the device is in the normal condition where a flash light device is not attached to the camera.
Figure 6:
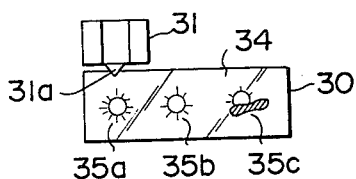
FIG. 6 is a plan view of the window in which weather marks are viewed in the exposure control device as shown in FIG. 5.
Figure 7:
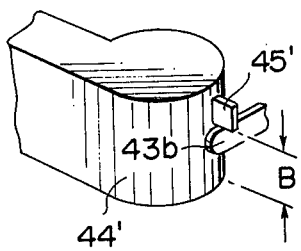
FIG. 7 is a fragmentary perspective view showing a film cartridge having a film sensitivity indicating means of different type from that shown in FIG. 5.
Figure 8:
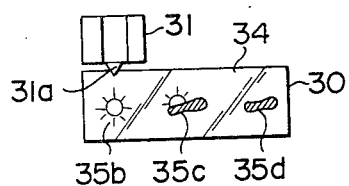
FIG. 8 is a plan view of the window in which weather marks are viewed in case where the film cartridge as shown in FIG. 7 is loaded in the camera with the device as shown in FIG. 5.

The mark indicating plate 34 is provided with a laterally extending slot 42 in which is engaged a pin 43a fixed to an end of the film sensitivity sensing lever 43. The film sensitivity sensing lever 43 is pivotally mounted in the camera and the other end 43b thereof is extended to sense a film sensitivity indicating means 45 formed on a film cartridge 44. The film sensitivity sensing lever 43 is urged with a spring 46 in the direction to sense the film sensitivity indicating means 45. The film sensitivity indicating means 45 is a projection in the example shown in FIG. 5. The length of the projection along the surface of the film cartridge 44 is changed according to the film sensitivity of the film loaded in the cartridge 44. The remaining space indicated with A in FIG. 5 is accordingly changed with the sensitivity. FIG. 7 shows a film cartridge 44' with a film sensitivity indicating means 45' for a different sensitivity. The space remaining in this case is B which allows the end 43b of the sensing lever 43 to move beyond the projection as shown in FIG. 7. As the sensing lever 43 swings about the pivot from the position shown in FIG. 5 to that shown in FIG. 7, the mark indicating plate 34 is moved to the left from the position shown in FIG. 5. Therefore, the position of the marks viewed through the indicator window 30 are changed. In this particular example as shown in FIGS. 5 and 7, the weather marks 35a–35c shown in the window 30 as illustrated in FIG. 6 are moved to the left by one step and weather marks 35b–35d are shown in the window 30 as illustrated in FIG. 8. In more detail, when a film of higher sensitivity is loaded, the mark indicating plate 34 is moved as described above and the position of the marks are moved to the left so that the exposure control knob 31 should be moved to the left to stop down the aperture in order to take a picture of the optimum exposure under the same condition of weather.

In the above example, the types of the film sensitivity are limited to two types, high and low. In order to enable the sensing of more than two types of film sensitivity, a step cam 43b' as shown in FIG. 9 can be employed.

Said mark change-over plate 38 is further provided with a slot 47 extending in parallel to said longitudinal slots 37a and 37b of the mark indicating plate 34. The slot 47 of the mark change-over plate 38 is engaged with a pin 48a fixed to a flash sensing lever 48. The flash sensing lever 48 has said pin 48a at one end thereof and has a flash sensing end 48b at the other end thereof, and is pivotally mounted on a pivot in the camera at an intermediate part thereof. The flash sensing lever 48 is urged in the direction to cause said sensing end 48b to project into an accessory shoe 49 of the camera by means of a tension spring 51. Similarly to the first embodiment as shown in FIG. 3, when a flash light device 50 with a foot 50a is attached to the camera, the sensing end 48b of the flash sensing lever 48 is pushed in by the foot 50a of the flash light device 50. When the sensing end 48b is pushed in, the flash sensing lever 48 is swung in the direction to move the pin 48a fixed thereto in the direction to move the mark change-over plate 38 in a direction perpendicular to the direction in which the mark indicating plate 34 is moved back and forth along the slots 37a and 37b, wherby the kind of the marks is changed from the weather marks 35a–35d to the distance marks 36a–36d.

Now, the operation of the above described embodiment of the present invention will be described in detail with reference to FIGS. 5 to 10. When a film cartridge 44 having a film sensitivity indicating means 45 which forms a space A is loaded in the camera and a flash light device is not attached to the camera, the film sensitivity sensing lever 43 is swung counterclockwise as indicated with an arrow in FIG. 5 and the mark indicating plate 34 is moved to the right to show the marks 35a–35c as shown in FIG. 6. Further, since the flash light device is not attached to the camera, the sensing end 48b of the flash sensing lever 48 is projected into the accessory shoe 49 and accordingly the pin 48a of the lever 48 is moved to the position urged by the tension spring 51 to select the weather marks 35a–35d to be viewed through the indicator window 30. Then, if the film cartridge 44 is changed to one having a film sensitivity indicating means 45' forming a space B as shown in FIG. 7, the sensing end 43b of the film sensitivity sensing lever 43 is swung clockwise and the pin 43 thereof moves the mark indicating plate 34 to the left to shift the weather marks leftward as shown in FIG. 8.

Then, when the flash light device 50 is attached to the camera as shown in FIG. 10, the foot 50a of the flash light device 50 is inserted into the accessory shoe 49 and the sensing end 48b is pushed in thereby. Therefore, the flash light sensing lever 48 is swung counterclockwise and the pin 48a thereof moves the mark chang-over plate 38 to the position to bring the distance marks 36a–36d into alignment with the indicator window 30 as shown in FIG. 11. In this state, the first three distance marks 36a–36c are viewed in the window 30. Then, if the film cartridge 44 is changed from the one as shown in FIG. 10 to the one as shown in FIG. 7, the mark indicating plate 34 is shifted as mentioned before and the marks viewed through the window change as shown in FIG. 12 in which the second to the last marks 36b–36d are viewed.

Thus, in accordance with the second embodiment of the present invention, two series of different kinds of marks are selectively put into alignment with an indicator window in response to insertion and removal of a flash light device into and from an accessory shoe of the camera so that the exposure control can be made properly both in a normal photographing condition under natual illumination and in a flash light photographing condition. In addition in this embodiment, the exposure control is automatically adjusted with reference to the film sensitivity of the film loaded in the camera indicated on a film cartridge thereof.

We claim:

1. An exposure control device for a photographic camera comprising an exposure control means for changing an aperture size or a shutter speed, a mark indicating plate bearing thereon a plurality of exposure condition marks such as weather marks arranged in a line, said mark indicating plate further bearing thereon a plurality of distance marks arranged in a line in parallel to said exposure condition marks, a manually operable exposure control knob connected with said exposure control means and movable with respect to said mark indicating plate independently thereof, said exposure control knob having an index to be selectively aligned with one of said exposure condition marks or said distance marks, means for moving said mark indicating plate in a direction perpendicular to the direction in which said marks are lined so that one of the two lines of marks is selectively indicated through an indicator window, and a flash sensing means which senses the attachment and removal of a flash light device to and from an accessory shoe on the camera body connected with said mark indicating plate to move the mark indicating plate in said direction to selectively indicate one of the two lines of marks through the indicator window in response to attachment and removal of the flash light device.

2. An exposure control device as defined in claim 1 wherein said flash sensing means includes a sensing lever an end of which is projected into said accessory shoe on the camera body, and an interconnecting lever engaged at an end thereof with said sensing lever and at the other end thereof with said mark indicating plate, whereby the mark indicating plate is moved from a position where said exposure condition marks are indicated through said window to another position where said distance marks are indicated through said window in response to swing of said sensing lever caused by the attachment of the flash light device to the accessory shoe of the camera body.

3. An exposure control device as defined in claim 2 wherein said mark indicating plate is provided with a lateral slot to guide the lateral movement of the plate to select one of said two lines of marks and is spring urged in one direction along said slot, and said interconnecting lever is engaged with a part of the plate to move the plate along said slot overcoming the spring urge when the flash light device is attached to the accessory shoe of the camera body and said sensing lever is moved by a part of the flash light device inserted into the accessory shoe.

4. An exposure control device as defined in claim 1 wherein said mark indicating plate is provided with a guide slot engaged with a pin, said guide slot extending in the direction in which the exposure condition marks are lined, said pin being fixed to a member which is movable in the direction perpendicular to said direction in which the marks are lined, and said flash sensing means is connected with said movable member.

5. An exposure control device as defined in claim 4 wherein said flash sensing means is a lever, one end of said lever is projected into an accessory shoe of the camera body to sense the insertion of a flash light device thereinto, and the other end of said lever is engaged with said movable member.

6. An exposure control device as defined in claim 1 further comprising a film sensitivity sending means which senses the sensitivity of a film loaded in a film cartridge charged in the camera body, said film sensitivity sensing means being connected with said mark indicating plate to move the mark indicating plate in the direction in which said marks are lined.

7. An exposure control device as defined in claim 6 wherein said mark indicating plate is provided with a slot extending perpendicularly to the direction in which said marks are lined, and said film sensitivity sensing means comprises a lever one end of which is engaged with said slot in the mark indicating plate and the other end of which is spring urged to sense a film sensitivity indicating means provided on the film cartridge.

8. An exposure control device as defined in claim 7 wherein said the other end of the film sensitivity sensing lever is shaped to have a step portion consisting of a plurality of steps one of which is to abut on the film sensitivity indicating means.

9. An exposure control device for a photographic camera comprising an exposure control means for changing an aperture size or a shutter speed, a mark indicating plate bearing thereon a plurality of exposure condition marks such as weather marks arranged in a line movable in the direction in which the exposure condition marks are lined, and a manually operable exposure control knob connected with said exposure control means, said exposure control knob having an index to be selectively aligned with one of said exposure condition marks and a film sensitivity sensing means which senses the sensitivity of a film loaded in a film cartridge charged in the camera body, said film sensitivity sensing means being connected with said mark indicating plate to move the mark indicating plate in the direction in which said marks are lined.

10. An exposure control device as in claim 9 where said manually operable control means is independently movable with respect to said mark indicating plate.

* * * * *